Aug. 4, 1959   J. C. GUÉRIN   2,898,132
SEALING OF A ROTARY MACHINE
Filed March 12, 1956

INVENTOR
JACQUES CHARLES GUERIN

BY Cameron, Kerkam & Sutton
ATTORNEYS

United States Patent Office 2,898,132
Patented Aug. 4, 1959

2,898,132

SEALING OF A ROTARY MACHINE

Jacques Charles Guérin, Neuilly-sur-Seine, France, assignor to Societe des Forges et Ateliers du Creusot, Paris, France Application March 12, 1956, Serial No. 570,800

Claims priority, application France March 17, 1955

3 Claims. (Cl. 286—7)

The invention relates to the sealing of a rotary machine through which liquid flows, for example, the sealing between the rotor and the stator of a hydraulic turbine.

The sealing of rotary machines has hitherto been effected by means of glands comprising a sealing element co-operating with a bearing, the sealing element and a corresponding collar being mounted on the two components in motion relative to one another of the machine, between which the sealing is to be effected. These sealing glands offered various inconveniences, and in particular they wore out rather quickly since they worked constantly.

One of the objects of the invention is to overcome this inconvenience and to obviate the wear of the gland while the machine is in operation.

The subject of the invention is a rotary machine through which flows a fluid comprising two members in rotary motion relative to one another, and a sealing gland between these two members comprising a resilient sealing element mounted on one of these members and co-operating with a seat provided on the other member for preventing the passage of the fluid, the said sealing element forming a partition wall between two casings, a first casing which is not to receive any fluid and a second casing into which the fluid penetrates, in which rotary machine the sealing element is constituted by a resilient diaphragm tending to bear on its seat under the action of the fluid pressure prevailing in the second casing, means being provided for sucking off the fluid from the said second envelope in the course of running of the machine.

The invention will now be described in more detail with reference to embodiments given by way of example and illustrated in the drawings.

Figure 1:
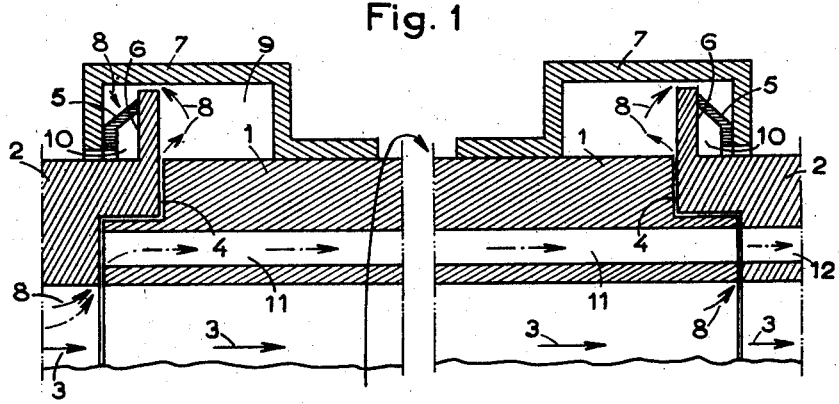
Figure 1 shows in a sectional plan view through its axis a rotary component of a machine such as a hydraulic turbine and through stationary components of this machine.
Figure 3:
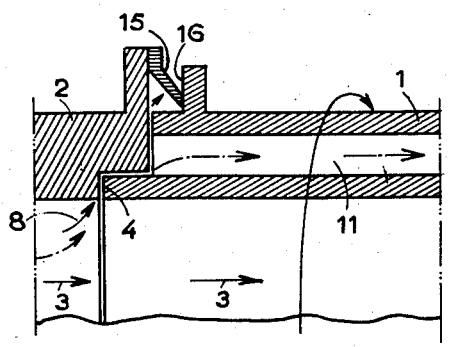

Figure 3 is a section corresponding to that of Figure 1 of a modification of an embodiment of the invention, Figure 1 shows diagrammatically part of the rotor 1 of a turbine rotating in front of the stator 2. The turbine is passed by a flow of water in the direction of the arrows 3. This water determines the rotation of the rotor which in its interior carries vanes (not shown). The clearance 4 existing between the rotor and the stator is made as small as possible, in such a manner as to prevent the flow of water, but it cannot be completely abolished, and therefrom results during operation and at a standstill a leakage which in certain cases has to be prevented absolutely, for example when there are electric coils in the immediate neighborhood.

As it is indispensible to have supplementary glands, the difficulty pointed out hereinabove makes itself felt, that is to say the difficulty due to the wearing out of the gland. This difficulty has been overcome by the present invention.

Figure 1 shows glands comprising a resilient diaphragm 5 capable of abutting on a collar 6 for establishing a seal.

The resilient diaphragm 5 is mounted on a sleeve 7 which is fixedly attached to the rotor 1.

As will be seen from Figure 1, the flexible diaphragm 5 is orientated in such a manner that when the rotor turns it finds itself subject to a centrifugal force which tends to effect its disengagement from the corresponding collar 6. During the rotation of the rotor, none of the resilient diaphragms 5 therefore wears itself out by contact with the collar 6, on which, on the other hand, it bears automatically owing to its resiliency as soon as the rotor comes to a standstill.

The flow of water passing, at a standstill, between the rotor and the stator, is indicated in Figure 1 by the arrows 8 in full lines. It will be seen that this water is completely stopped by the seals comprising the diaphragms 5.

During the rotation of the rotor the seals 5 which tend to disengage themselves from their seats 6, do not wear themselves out, but on the other hand do not provide a sufficient sealing effect any more. In order to prevent the passage of water through annular cavity 9 into which the water penetrates at the standstill, and annular cavity 10 situated behind the gland where the water must not penetrate, according to the invention means are provided for sucking off the liquid which might penetrate into the casings 9 during the operation of the turbine.

These means are constituted by longitudinal conduits 11, provided in the wall of the rotor 1, and by conduits 12 provided in the downstream portion of the machine, these conduits 11 and 12 issuing into the clearance space 4 existing between the rotor and the stator.

Figure 2:
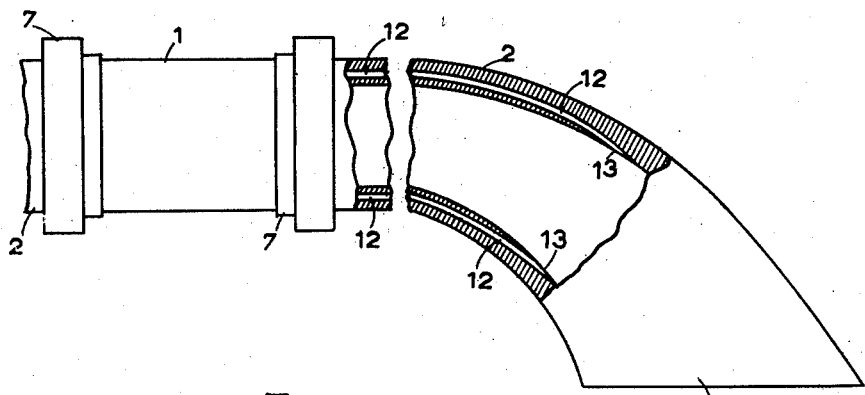
Figure 2 shows on a smaller scale and in an outside view partly broken off, the turbine illustrated in Figure 1, provided with its draft tube.

The conduits 12 may, as illustrated in Figure 2, issue at 13 into the draft tube 14 of the turbine or alternatively be connected directly to a pump sucking off the liquid, which pump is for example driven directly by the turbine.

During the operation of the turbine, the suction prevailing in the conduits 11 and 12 is largely sufficient for evacuating the water which has penetrated between the rotor and the stator, the flow of water then being indicated by the arrows in chain-dotted lines. The sealing glands comprising the resilient diaphragms 5 are not therefore needed then, and, according to the invention, these diaphragms may be disengaged from their collars in such a manner as to prevent their wearing out.

Figure 3 shows a modification of embodiment.

The diaphragms 5 forming the sealing elements of the glands illustrated in Figure 1 were subject to centrifugal force. Figure 3 concerns the case where the sealing element, likewise constituted by a resilient diaphragm, is mounted on the stator of the machine. It is consequently not subject to centrifugal force, but it may tend to be deflected, in one sense owing to its elasticity, and in the opposite sense owing to a hydraulic pressure.

Figure 3 shows the stator 2 carrying a resilient diaphragm 15 forming a sealing element and designed to come into contact with a collar 16 fixedly attached to the rotor 1. The resilient diaphragm 15 has such a form that when it is fitted into its place and is not subject to any hydraulic pressure, it does not bear on the collar 16.

It is well understood that when hydraulic pressure is applied to the diaphragm 15 from the interior of the turbine, this diaphragm will bear on the collar 16 in such a manner as to establish a tight seal.

During the operation of the turbine, the water which penetrates into the clearance space 4 may be evacuated by suction, as shown by the arrows in chain-dotted lines, into the conduits 11 in communication with the draft tube 14, or with a pump, as in the embodiment illustrated in Figures 1 and 2.

There is not then any hydraulic pressure acting on the diaphragm 15, the latter does not therefore bear strongly on its collar 16, and the gland does not wear out.

When the turbine has come to a standstill, the suction ceases in the conduits 11, and the hydraulic pressure resulting from the leakage through the clearance space 4 becomes active on the resilient diaphragm 15 which then bears strongly on its collar 16 to establish a seal.

Well understood, the invention is not limited to the particular embodiments which have been described with reference to the drawings. Details thereof may be changed without leaving the scope of the invention.

What I claim is:

1. In a seal as described, a first member, a second member mounted for rotational movement relative to said first member, a resilient diaphragm mounted on one of said members, a seat on the other of said members for said diaphragm, a fluid receiving chamber on one side of said diaphragm when said members are at rest, and fluid passages in said members communicating with said fluid receiving chamber for a fluid passing therethrough, said fluid seating said diaphragm on said seat when said members are at rest and aspirating fluid from said fluid receiving chamber when said members are in relative rotational movement, said resilient diaphragm being mounted on the rotary one of said members and moved by centrifugal force away from said seat.

2. In a seal as described, a first member, a second member mounted for rotational movement relative to said first member, a resilient diaphragm mounted on one of said members, a seat on the other of said members for said diaphragm, a fluid receiving chamber on one side of said diaphragm when said members are at rest, and fluid passages in said members communicating with said fluid receiving chamber for a fluid passing therethrough, said fluid seating said diaphragm on said seat when said members are at rest and aspirating fluid from said fluid receiving chamber when said members are in relative rotational movement, including means for applying suction to said fluid passages during relative rotation of said members to evacuate fluid from said casing.

3. A seal as described in claim 2 including a zone of reduced fluid pressure created by the flow of said fluid and in which said means for applying suction include extensions of said fluid passages in the stationary one of said members communicating with said zone.

References Cited in the file of this patent

UNITED STATES PATENTS

| | | |
|---|---|---|
| 1,518,368 | Steed | Dec. 9, 1924 |
| 2,171,968 | Augustin | Sept. 5, 1939 |
| 2,259,361 | Vorkauf | Oct. 14, 1941 |
| 2,567,641 | Hazelton | Sept. 11, 1951 |
| 2,665,929 | Sawyer | Jan. 12, 1954 |